United States Patent
Lin et al.

(10) Patent No.: US 7,826,450 B2
(45) Date of Patent: Nov. 2, 2010

(54) MULTICAST/BROADCAST EXTENSION TO A POINT-TO-POINT UNICAST-ONLY PACKET SWITCH SYSTEM

(75) Inventors: Jim Lin, Sunnyvale, CA (US); Vijayasimha Kadamby, Fremont, CA (US)

(73) Assignee: Infineon Technologies AG, Neubiberg (DE)

( * ) Notice: Subject to any disclaimer, the term of this patent is extended or adjusted under 35 U.S.C. 154(b) by 1459 days.

(21) Appl. No.: 11/114,734

(22) Filed: Apr. 25, 2005

(65) Prior Publication Data

US 2006/0239290 A1 Oct. 26, 2006

(51) Int. Cl.
*H04L 12/28* (2006.01)

(52) U.S. Cl. ...................................... 370/390; 370/432
(58) Field of Classification Search ................. 370/432, 370/401, 402, 422, 433, 351
See application file for complete search history.

(56) References Cited

U.S. PATENT DOCUMENTS

| 5,511,168 A * | 4/1996 | Perlman et al. ............. 709/243 |
| 7,248,587 B1 * | 7/2007 | Sharma ...................... 370/394 |
| 2002/0012327 A1 | 1/2002 | Okada |
| 2006/0133369 A1 * | 6/2006 | Zhang ........................ 370/389 |

OTHER PUBLICATIONS

Albana. IANA Guidelines for IPv4 Multicast Address Assignments RFC 3171 Aug. 2001.*
Rapido: "Synopsis of the Multicast Extensions," Jun. 2004, URL:http://www.techonline.com/pdf/pavillio/ns/standards/rapido_multicast.pdf.
Rapido: "RapidIO™ Interconnect Specification Part 11: Multicast Extensions Specification," Jun. 2005, URL:http://www.rapido.org/zdata/specs/mcs_pec.pdf.

* cited by examiner

*Primary Examiner*—Donald L Mills
*Assistant Examiner*—Henry Baron
(74) *Attorney, Agent, or Firm*—Dickstein Shapiro LLP.

(57) ABSTRACT

A method and system for routing a multicast packet through a unicast packet switch network of devices. A virtual destination group, which includes destination devices of the multicast packet, is defined, and then the virtual destination group is mapped to an unused unicast destination encoding in routing tables of the devices. The multicast packet is then routed from a source device to the destination devices using the routing tables.

14 Claims, 1 Drawing Sheet

Destination-Source Transport Bit Stream

MULTICAST/BROADCAST EXTENSION TO A POINT-TO-POINT UNICAST-ONLY PACKET SWITCH SYSTEM

FIELD OF THE INVENTION

The present invention relates to a system and method for forwarding data packets in a network, and more particularly to broadcasting or multicasting data packets in a point-to-point unicast-only packet switch system by adding a multicast/broadcast extension.

BACKGROUND OF THE INVENTION

A point-to-point unicast-only packet switch system is a system in which a packet is switched via a point-to-point link by looking up a destination identification of the packet in a routing table residing in a switch. A packet can be routed via many of these point-to-point links by carefully constructing the routing table at each of the switches along the route. The term "unicast" means that the packet can have only one destination.

The RapidIO specification is a point-to-point unicast-only packet switch system and defines at the transport level a packet type that allows a single source and destination. FIG. 2 is a conventional packet structure of a transport header definition bit stream, and is a reproduction of FIG. 1-3 of the RapidIO specification Rev. 1.2, page III-10. Three fields (i.e., tt field 201, destinationID field 203, and sourceID field 204) added to the logical packets 202 and 205 allow for two different sizes of device identification (ID) fields—a large (16-bit) and a small (8-bit). The two sizes of device ID fields allow two different system scalability points to optimize a packet header overhead, and only affix additional transport field overhead if the additional addressing is required. The small device ID field allows for a maximum of 256 devices (e.g., switches) to be attached to the fabric, and the large device ID field allows for systems with up to 65,536 devices. A description of the remainder of this figure is not provided here.

The RapidIO packet switch system does not include multicast and broadcast capabilities. Multicast is defined to be a transmission of the same packet simultaneously to a select group of network elements; a simple example of multicasting is sending an e-mail message to a mailing list. Broadcast is defined to be a transmission of the same packet simultaneously to all network elements. A distinction is made between multicasting and broadcasting in that multicasting refers to transmitting a packet to a select group of network elements whereas broadcasting refers to transmitting a packet to all network elements.

In order for the RapidIO packet switch system to support multicast and broadcast functions, one conventional solution has been to duplicate a packet into many unicast packets so that all possible destinations receive one such unicast packet. Another conventional solution has involved making changes to the system, usually through special fields in the packet payload (e.g., ftype=15 (0xF) of the RapidIO specification is used to describe a user-defined packet format whose payload can be defined to contain fields for multicast transmission).

SUMMARY OF THE INVENTION

The present invention provides a method and system for routing a multicast packet through a unicast packet switch network of devices. A virtual destination group, which includes destination devices of the multicast packet, is defined, and then the virtual destination group is mapped to an unused unicast destination encoding in routing tables of the devices. The multicast packet is then routed from a source device to the destination devices using the routing tables.

BRIEF DESCRIPTION OF THE DRAWINGS

The foregoing and other features of the present invention will be more readily apparent from the following detailed description and drawings of illustrative embodiments of the invention, in which.

DETAILED DESCRIPTION OF THE INVENTION

A. System Overview

Figure 1:
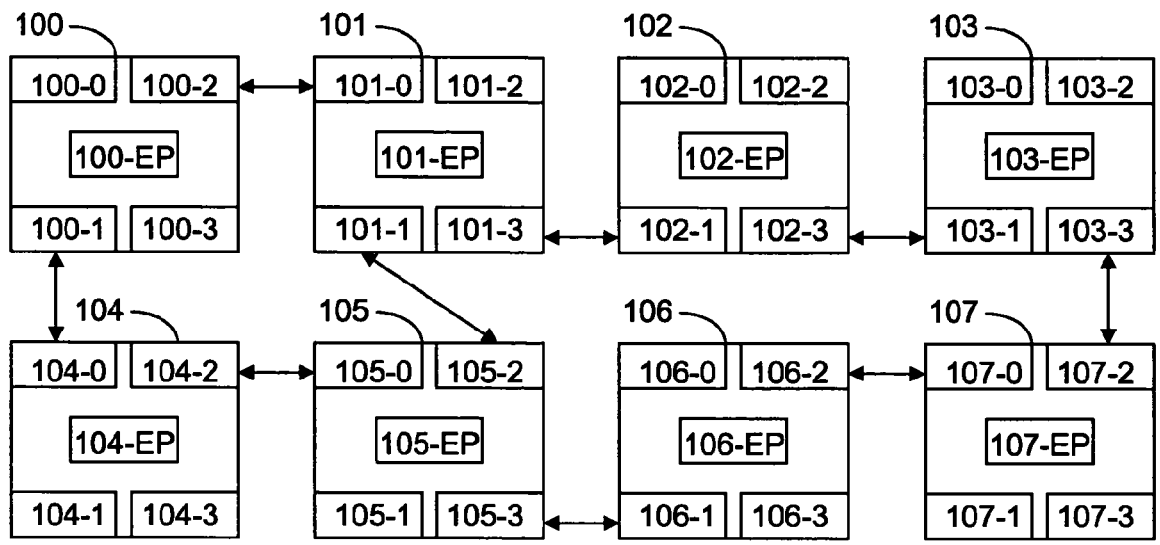
FIG. 1 illustrates an example of system operation according to an embodiment of the present invention.
Figure 2:
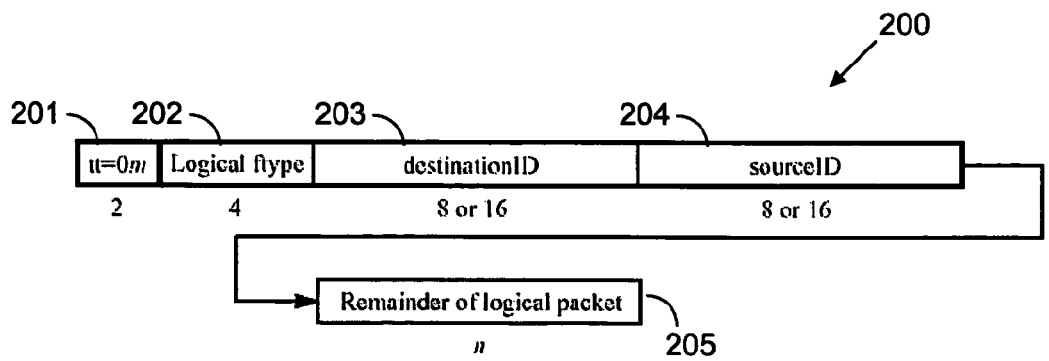
FIG. 2 illustrates an example of a conventional packet structure, as defined by the RapidIO specification.

The present invention relates to a system and method for multicasting or broadcasting data packets in a point-to-point unicast-only packet switch system without modifying the data packets or issuing duplicate packets at the source. This present invention uses the unicast packet format, as defined by the RapidIO specification or other similar specification, and overlays multicast and broadcast capabilities by adding a multicast/broadcast extension. This is accomplished by a combination of (1) mapping virtual destination groups (VDG) to a unicast destination field, (2) using a specific routing table format, and (3) using multicast-aware packet buffer management.

B. Multicast/Broadcast Extension to Unicast Packet Format

1. Mapping VDGs to a Unicast Destination Field

A virtual destination group is defined to be a specific enumeration of multicast destinations in the system. For example, if a packet needs to be received by devices (e.g., switches or processors) 1 and 2, a virtual destination group of VDG1 enumerating devices 1 and 2 is created. Alternatively, if a packet needs to be received by devices 1, 2, and 3, a virtual destination group of VDG2 enumerating devices 1, 2, and 3 is created because 1, 2 and 1, 2, 3 are separate enumerations requiring separate VDG numbers. A broadcast packet is a special case in that it encompasses all destinations. Since the broadcast destinations of one device are slightly different than the destinations of another device, each broadcasting device requires its own broadcast VDG assignment.

The multicast/broadcast extension of the present invention is created by mapping the VDG numbers onto the destination encoding scheme of the unicast system. It is assumed there are unused encodings in the unicast system. For example, if the encoding scheme uses an 8-bit number for each of the destinationID and sourceID fields of the unicast packet structure, the scheme allows up to 256 devices to be attached to the fabric. With the multicast/broadcast extension, it is important that not all 256 encodings be required by the unicast system, such that there are unused destinationIDs to which to map the various VDG numbers. The more unused encodings there are, the more VDGs that are possible.

2. Routing Table Format

As a packet is routed through the system traveling towards all of its device destinations specified by a particular VDG number that has been mapped to a unicast destination encoding scheme, routing tables in the devices determine how the VDG is routed at each device. The routing table has entries for unicast destinations as well as multicast destinations, and the table is a mapping of the destination and the physical port number from which the packet needs to be sent from a particular device. Each bit position in the table corresponds to a physical port, so that single port destinations can coexist with multiple port destinations (in the case of multicast). This is accomplished without changing the destination information in the original packet.

The following Table 1 is an example of a portion of the routing table in a device, the entries of which are not contiguous.

TABLE 1

| 0 | 1 | 2 | 3 | 4 | 5 | End-point | |
|---|---|---|---|---|---|---|---|
|   | 1 |   |   |   |   |   | unicast, to port 1 |
|   |   |   |   |   |   | 1 | unicast, to current device |
|   |   | 1 |   |   |   | 1 | multicast, to both current and port 2 |
| 1 |   |   |   |   | 1 |   | multicast, to ports 0 and 5 |
| 1 | 1 | 1 | 1 | 1 | 1 |   | broadcast, to all ports except originating device |

3. Multicast-Aware Packet Buffer Management

Each device has at least one packet buffer, and a single copy of each of the packets is buffered in the packet buffer of each device to which the respective packets are sent. The validity of each packet buffer entry in a particular device must be tracked in order to determine when it should be deallocated. One way is for the packet buffer entry to use the routing table entry of the device to keep track of the validity of each packet on a per port basis. As a packet is sent from a particular port, a valid bit corresponding to that port is reset. The packet is valid as long as not all valid bits are reset. Once all valid bits are reset, i.e., all ports have forwarded the packet, the packet buffer entry is deallocated. An alternative way to keep track of the validity of the packet buffer entry is to use a total counter, which is set to represent the total number of ports of the device through which the packet must be sent. More specifically, as a packet is sent from a port, the counter is decremented. When the counter is decremented to zero, i.e., all ports have forwarded the packet, the packet buffer entry is deallocated.

C. Example of System Operation

FIG. 1 illustrates an example of the system operation according to an embodiment of the present invention. The topology of this example includes 8 devices 100-107. Each device (e.g., switch or processor) has 4 ports 0-3 (i.e., 100-0 to 100-3 for device 100, 101-0 to 101-3 for device 101, . . . 107-0 to 107-3 for device 107), and one end point (i.e., 100-EP for device 100, 101-EP for device 101, . . . 107-EP for device 107). The ports of the devices are hard-wired together in advance as represented by the double-headed arrows. In this example, a multicast packet is transmitted from device 100 to devices 101, 103, 104, and 107. The encoding for the destination is 4-bit wide, and thus it is possible to have up to 16 devices in the system. In the example of this embodiment there are 8 devices, and each of these devices is assigned to an encoding. Thus the remaining 8 encodings can be used for VDGs. First, VDG1 is assigned to be devices 101, 103, 104, and 107, and then VDG1 is mapped to a virtual device number 15.

The entry 15 (i.e., virtual destination device) contents for the routing tables for each of the 8 devices 100-107 are shown below in Table 2. Note that each entry 15 is that of a different routing table. Whenever a packet having a destinationID of 15 (i.e., a packet destined for VDG1) is received at a given device, the entry corresponding to that device is used.

TABLE 2

| Entry (Virtual Destination Device No.) | Device | Port 0 | Port 1 | Port 2 | Port 3 | End Point |
|---|---|---|---|---|---|---|
| 15 | 100 |   | 1 | 1 |   |   |
| 15 | 101 |   |   |   | 1 | 1 |
| 15 | 102 |   |   |   | 1 |   |
| 15 | 103 |   |   |   |   | 1 |
| 15 | 104 |   |   | 1 |   | 1 |
| 15 | 105 |   |   |   | 1 |   |
| 15 | 106 |   |   | 1 |   |   |
| 15 | 107 |   |   |   |   | 1 |

Using this virtual device number of 15, a routing table is constructed that routes the packets to devices 101, 103, 104, and 107. The route is described as follows.

1. Starting at device 100, according to entry 15 in the routing table of device 100 (see Table 2 above), the packet in the device 100 packet buffer is first forwarded to both ports 1 (100-1) and 2 (100-2) of device 100.

2. At device 101, since one of the destinations is this device, the packet goes to the end point 101-EP of this device. However in order to route the packet to device 103, the packet needs to transmit from port 3 (101-3).

Note that based on the hard-wiring of the devices, device 107 is reachable from device 101 via devices 105 and 106. However, the routing tables are programmed to instead use device 104 for the routing from device 100, so port 1 (101-1) of device 101 is not used to forward this packet to device 105.

3. At device 102, the packet need only be routed to device 103, so device 102 transmits the packet it received on port 1 (102-1) out via port 3 (102-3).

4. Device 103 is the end point and therefore consumes the packet at end point 103-EP of this device. No forwarding of the packet is required because as discussed above, device 107 is supplied the packet via device 104.

5. Device 104 acts as an end point as well as forwards the packet out through port 2 (104-2) to device 105, but bound for device 107.

6. Device 105 forwards the packet using port 3 (105-3).

7. Device 106 forwards the packet using port 2 (106-2).

8. Like device 103, device 107 acts only as an end point and therefore consumes the packet at the end point 107-EP.

The multicast of this packet from device 100 to devices 101, 103, 104, and 107 is complete.

The software configuring the routing table for each device needs to know the topology of the port connections. The routing tables are invalidated if connections change dynamically. However, the present invention is applicable in both static and dynamic cases if the routing table complexity can be handled.

The software maintaining the routing table for each device does not change in complexity from that for a fully unicast routing table manager. The addition or deletion of new devices needs to propagate through the network completely before the change can be reflected in the network. The details of this method are outside the scope of the invention, and thus will not be addressed here. Further, the teardown of a device—virtual or real—needs to similarly propagate throughout the network.

The number of VDGs can not exceed the number of free encodings (i.e., device numbers or destinationIDs). The number of permutations of multicast possibilities is therefore limited. Moreover, a VDG and its associated routing table entries need to be updated if membership of the VDG changes.

The present invention may be used for routing antenna data (i.e., digitized data from the base station antennas) to multiple processing elements. Without multicast, a dedicated link would be needed for each processing element. With multicast, each processing element requires only 2 ports—one receive port and one transmit port. In a system where data needs to be multicast to 20 different processing elements, the advantage of the multicast system of the present invention is significant.

What is claimed is:

1. A method of routing a multicast packet through a unicast packet switch network of devices, the method comprising:
   defining a virtual destination group, which includes destination devices of the multicast packet;
   mapping the virtual destination group to an unused unicast destination code in routing tables of the devices;
   routing the multicast packet from a source device to the destination devices using the routing tables; and
   tracking validity of the multicast packet stored in a buffer of at least one of the network devices.

2. The method of claim 1, wherein at least one the devices can transmit the multicast packet from more than one port.

3. The method of claim 1, wherein the virtual destination group is dynamic.

4. The method of claim 1, wherein the step of tracking validity comprises:
   resetting a valid bit corresponding to a port of the at least one network device after the packet is sent through the port; and
   deallocating the multicast packet stored in the buffer when all valid bits are reset.

5. The method of claim 1, wherein the step of tracking validity comprises:
   setting a counter to represent a total number of ports of the at least one network device through which the multicast packet is to be sent;
   decrementing the counter each time the multicast packet is sent through one of the ports of the at least one network device; and
   deallocating the stored multicast packet when the counter is decremented to zero.

6. The method of claim 1, wherein the virtual destination group includes all devices on the network so that the multicast packet is a broadcast packet, and wherein the routing step involves routing the broadcast packet from a source device to all of the devices on the network using the routing tables.

7. A system for routing a multicast packet through a unicast packet switch network of devices, comprising:
   a unicast routing table for each device having unused unicast entries in which a routing for a virtual destination group can be stored, the virtual destination group defining multicast packet destinations for a plurality of designated devices on the network;
   a control unit configured to set the destination of the multicast packet to the virtual destination group, whereby the mapping of the routing tables sends the multicast packet to each of the devices in the virtual destination group; and
   a means for tracking validity of the multicast packet stored in a buffer of at least one of the network devices.

8. The system of claim 7, wherein at least one the devices can transmit the multicast packet from more than one port.

9. The system of claim 7, wherein the virtual destination group is dynamic.

10. The system of claim 7, wherein means for tracking validity comprises:
    a means for resetting a valid bit corresponding to a port of the at least one network device after the packet is sent through the port; and
    a means for deallocating the multicast packet stored in the buffer when all valid bits are reset.

11. The system of claim 7, wherein the means for tracking validity comprises:
    a means for setting a counter to represent a total number of ports of the at least one network device through which the multicast packet is to be sent;
    a means for decrementing the counter each time the multicast packet is sent through one of the ports of the at least one network device; and
    a means for deallocating the stored multicast packet when the counter is decremented to zero.

12. A unicast packet switching system comprising:
    switching devices;
    a processor;
    a memory communicatively coupled to the processor; and
    software executing in the processor configured to carry out the method of claim 1.

13. A system for routing a multicast packet through a unicast packet switch network of devices, comprising:
    a unicast routing table for each device having unused unicast entries in which a routing for a virtual destination group can be stored, the virtual destination group defining multicast packet destinations for a plurality of designated devices on the network, wherein the unicast routing table is configured to track validity of the multicast packet stored in a buffer of at least one of the network devices; and
    a control unit configured to set the destination of the multicast packet to the virtual destination group, whereby the mapping of the routing tables sends the multicast packet to each of the devices in the virtual destination group.

14. A system for routing a multicast packet through a unicast packet switch network of devices, comprising:
    a unicast routing table for each device having unused unicast entries in which a routing for a virtual destination group can be stored, the virtual destination group defining multicast packet destinations for a plurality of designated devices on the network;
    a control unit configured to set the destination of the multicast packet to the virtual destination group, whereby the mapping of the routing tables sends the multicast packet to each of the devices in the virtual destination group; and
    a counter configured to track validity of the multicast packet stored in a buffer of at least one of the network devices.

* * * * *